United States Patent [19]

Mock, Jr. et al.

[11] Patent Number: 5,107,627
[45] Date of Patent: Apr. 28, 1992

[54] METHODS OF AND APPARATUS FOR POLISHING AN ARTICLE

[75] Inventors: Robert W. Mock, Jr., Lawrenceville; Harold F. Muth, Jr., Roswell; Donald Q. Snyder, Marietta, all of Ga.

[73] Assignee: AT&T Bell Laboratories, Murray Hill, N.J.

[21] Appl. No.: 578,996

[22] Filed: Sep. 4, 1990

[51] Int. Cl.⁵ .......................... B24B 5/00; B24B 7/22
[52] U.S. Cl. .................................... 51/283 R; 51/120
[58] Field of Search ............ 51/283 R, 283 E, 284 R, 51/284 E, 281 SF, 216 L, 217 L, 229, 277, 125, 131.3, 119, 120

[56] References Cited

U.S. PATENT DOCUMENTS

| | | | |
|---|---|---|---|
| 4,291,502 | 9/1981 | Grimsby | 51/120 |
| 4,384,431 | 5/1983 | Jackson | 51/34 E |
| 4,512,630 | 4/1985 | Runge | 350/96.21 |
| 4,539,776 | 9/1985 | Weaver | 51/156 |
| 4,693,035 | 9/1987 | Doyle | 51/284 R |
| 4,711,053 | 12/1987 | Snyder | 51/3 |
| 4,831,784 | 5/1989 | Takahashi | 51/119 |
| 4,839,993 | 6/1989 | Masuko et al. | 51/129 |
| 4,967,518 | 11/1990 | Moulin | 51/125.5 |
| 4,979,334 | 12/1990 | Takahashi | 51/120 |

FOREIGN PATENT DOCUMENTS

| | | | |
|---|---|---|---|
| 8804217 | 6/1988 | European Pat. Off. | 51/2 R |
| 2429648 | 2/1980 | France | 51/120 |
| 0019365 | 1/1987 | Japan | 51/216 LP |
| 0034762 | 2/1987 | Japan | 51/281 SF |

Primary Examiner—Robert A. Rose
Attorney, Agent, or Firm—Edward W. Somers

[57] ABSTRACT

An apparatus (19) which is capable of being used in the field is adapted to polish fiber end faces each terminated by a plurality of cylindrically shaped ferrule type connector plugs (30—30). The apparatus includes a platform (50) which includes a plurality of nests (52—52) each adapted to receive a plug such that a plug end face (29) is disposed adjacent to a polishing surface and such that an end portion of fiber which protrudes from each plug engages the polishing surface. Facilities are provided in each nest for applying forces to each plug which may be varied to control the pressure between each fiber end face and the polishing surface and, if desired, subsequently between each plug end face and the polishing surface. Relative motion between the plurality of plugs and the polishing surface is caused to exist such that the polishing surface is turned rotatably while being revolved about an axis to provide uniformly polished fiber end faces. The apparatus also may be used to contour-polish simultaneously a plurality of plugs prior to terminating optical fibers therewith.

4 Claims, 6 Drawing Sheets

METHODS OF AND APPARATUS FOR POLISHING AN ARTICLE

TECHNICAL FIELD

This invention relates to methods of and apparatus for polishing an article. More particularly, this invention relates to methods of and apparatus for polishing end faces of optical fibers which extend from end faces of plugs which are used to terminate optical fibers and/or for polishing end faces of the plugs.

BACKGROUND OF THE INVENTION

Connections between optical transmission paths may be made by terminating optical fiber with plugs and by holding two such plugs which terminate optical fibers to be connected in predetermined positions with respect to each other. One such connection arrangement is referred to as a biconic connector which is disclosed in U.S. Pat. No. 4,512,630 which issued on Apr. 23, 1985 in the name of P. K. Runge. In it, each optical fiber is terminated in a plug having a truncated conical shape. Two such plugs are disposed in a biconical sleeve with small diameter end portions of the plugs being adjacent to a center plane. Another optical fiber connector is AT&T's ST® connector which comprises a cylindrically shaped ferrule or plug that terminates an optical fiber. The plug is disposed within a cap and is biased outwardly. Two such plugs may be inserted into a sleeve having a longitudinal slot therein with the end faces of the plugs being in contact with each other or spaced apart by an attenuator.

In order to achieve low loss, low reflectance connections, the end faces of the two plugs in which the optical fibers terminate need to have surfaces which are substantially normal to the longitudinal axes of the plugs and which may have optical fibers protruding slightly therefrom and being smoothly polished. Otherwise, the surfaces may be skewed to each other and/or surface roughness may cause the end faces of the fiber cores not to be substantially in engagement with each other or in engagement with an attenuator that may be disposed between the end faces.

Also, an end portion of each optical fiber which is terminated by a plug needs to be polished. After an optical fiber has been inserted into a passageway of the plug, an end portion of the fiber which extends beyond the end face of the plug is cleaved. This is a relatively rough, imprecise operation which leaves a portion of fiber extending beyond the end face of the plug. The protruding end must be polished so that an end face of the fiber is coplanar with or protrudes slightly from the end face of the plug. Such an operation must be carried out carefully to avoid fracturing the length of fiber which remains after the cleaving operation.

In the prior art, polishing of end faces of connector plugs and fiber has been accomplished manually. A connector plug to be polished is mounted in a fixture and the fixture is moved in oscillating circular patterns with the end face of the fiber and subsequently the plug in engagement with a polishing surface of a predetermined grit size. Such a fixture which may be used to polish an end face of a truncated conically shaped connector plug is disclosed in U.S. Pat. No. 4,539,776 which issued on Sep. 10, 1985 in the name of F. R. Weaver.

The manual polishing of fiber and connector plug end faces is not without problems. It should be apparent that such a procedure is subject to operator variations in pressure applied to the fixture and hence that between grit of the polishing surface and the end faces. Also, the length of time, the motion and the path along which the plug traverses may vary from plug to plug thus producing inconsistent results in fiber end face protrusion and extent of polish.

Also available in the prior art is apparatus for gang-polishing a plurality of connector plugs. Each of a plurality of plugs to be polished is mounted in a nest of a clamping ring. Then the clamping ring is moved desirably to cause ends of fibers protruding from the plugs to engage a polishing surface. The problems with such an apparatus are twofold. One problem is that when the fibers are cleaved, the length of fiber that extends beyond an end face of the plug varies significantly from plug to plug. When a plurality, for example, eight or twelve, are gang-polished, the fibers extending from several of the plugs may be longer and hence experience greater pressure as forces are applied to the clamping ring for the plurality of plugs. This greatly increases the possibility of cracking those fibers which extend farther from associated plug end faces than others. Secondly, the plugs may vary in length and yet be within prescribed tolerance limits. As a result of the variations in plug length, some of the plugs may be under-polished whereas others may be over-polished.

The last described apparatus clearly is a step in the right direction if plug type optical fiber connectors are to enjoy widespread use in field splicing operations. Just as clearly, such an apparatus is not totally satisfactory because of its inability to compensate for variations in dimensional tolerances.

What is needed and what seemingly is not provided for in the prior art are methods and apparatus for preparing an end face of a ferrule type connector plug adapted to receive an end portion of a length of optical fiber to facilitate an optical connection with another plug-terminated optical fiber. Further, what is sought are methods and apparatus for the simultaneous treatment of fibers which extend from end faces of a plurality of cylindrically shaped connector plugs with the capability of being used in the field by craftpersons and with the capability of compensating for dimensional variations in lengths of the plugs and initial fiber protrusions.

SUMMARY OF THE INVENTION

The foregoing problems of the prior art have been overcome by the methods and apparatus of this invention. A method of polishing an article includes the step of inserting a free end portion of the article into a nest mounted in a platform. This is accomplished so that a free end of the article is caused to engage a polishing surface having a centerline axis which is normal to the polishing surface. Forces are caused to be applied by a device associated with the nest to the article to control the pressure between the end face of the article in the nest and the polishing surface. The forces are applied while the polishing surface is caused simultaneously to rotate about its centerline axis and to revolve about a second axis which is parallel to the centerline axis. As a result, the article is polished by an annular portion of the polishing surface.

A method of polishing simultaneously an end face of each of a plurality of optical fibers each extending from one of a plurality of cylindrically shaped connector plugs includes the step of inserting a free end portion of each of a plurality of the plugs into a nest which is mounted in a platform. The end face of each free end portion of each plug is caused to become disposed adjacent to a polishing surface supported by a backing material having a predetermined compliancy. Fiber protruding from each plug end face is caused to become disposed in engagement with the polishing surface. Forces are applied to each plug individually to control the pressure between the end face of each free end portion of fiber and the polishing surface while the polishing surface is caused to rotate about its centerline axis. Also, at the same time, the polishing surface is caused to revolve about a second axis such that the polishing surface is caused to rotate while it is being revolved about the second axis. Subsequently, as the fiber end portion is polished, the end face of the associated plug may engage the polishing surface and itself be polished.

Apparatus for polishing simultaneously end faces of a plurality of fiber end portions protruding from plugs includes a platform having a plurality of nests mounted thereon. Each nest is adapted to receive a connector plug therein such that an end face of a free end portion of each plug is disposed adjacent to a polishing surface below the platform and such that the fiber protruding therefrom engages the polishing surface. Associated with each nest are facilities for applying forces individually to the plug in the associated nest such that the pressure at the interface between the polishing surface and the fiber end face associated with the plug in the nest is controlled. Facilities are provided for causing the polishing surface to be turned rotatably about its centerline axis while it is caused to revolve about a second axis parallel to the centerline axis. As a result, each fiber end face is caused to be polished by an annular portion of the polishing surface.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
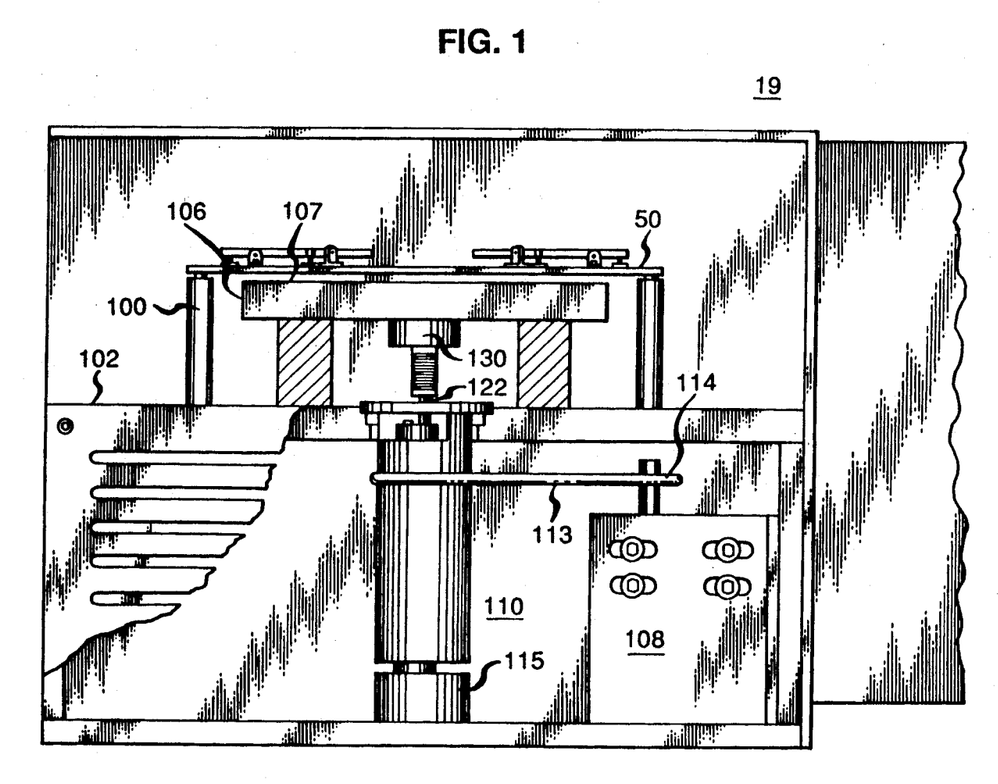
FIG. 1 is an elevational view of a portion of apparatus which includes a polishing surface for polishing end faces of optical fibers terminated by plugs.

Referring now to FIG. 1, there is shown an apparatus which is designated generally by the numeral 19 and which is adapted to polish simultaneously an end face of each of a plurality of optical fibers which have been terminated by connector components. More specifically, the apparatus 19 is adapted to polish an end portion of each of a plurality of optical fibers which are terminated by ferrule type connectors 20—20 (see FIGS. 2 and 3) such as the ST ® connector disclosed and claimed in U.S. Pat. No. 4,934,785 which issued on Jun. 19, 1990 in the names of T. D. Mathis and C. M. Miller each of which terminates an optical fiber 21. Two such connectors 20—20 may be used to provide a connection arrangement 22.

A connector 20 (see FIG. 2) which is adapted to terminate an optical fiber includes a plug assembly comprising a cylindrically shaped ferrule or plug 30 having a passageway 31 (see FIG. 3) and being made of a glass or ceramic material, for example. The plug 30 has an outer diameter of about 2500 microns. An end face 29 of the plug 30 includes an opening of the passageway 31.

Figure 2:
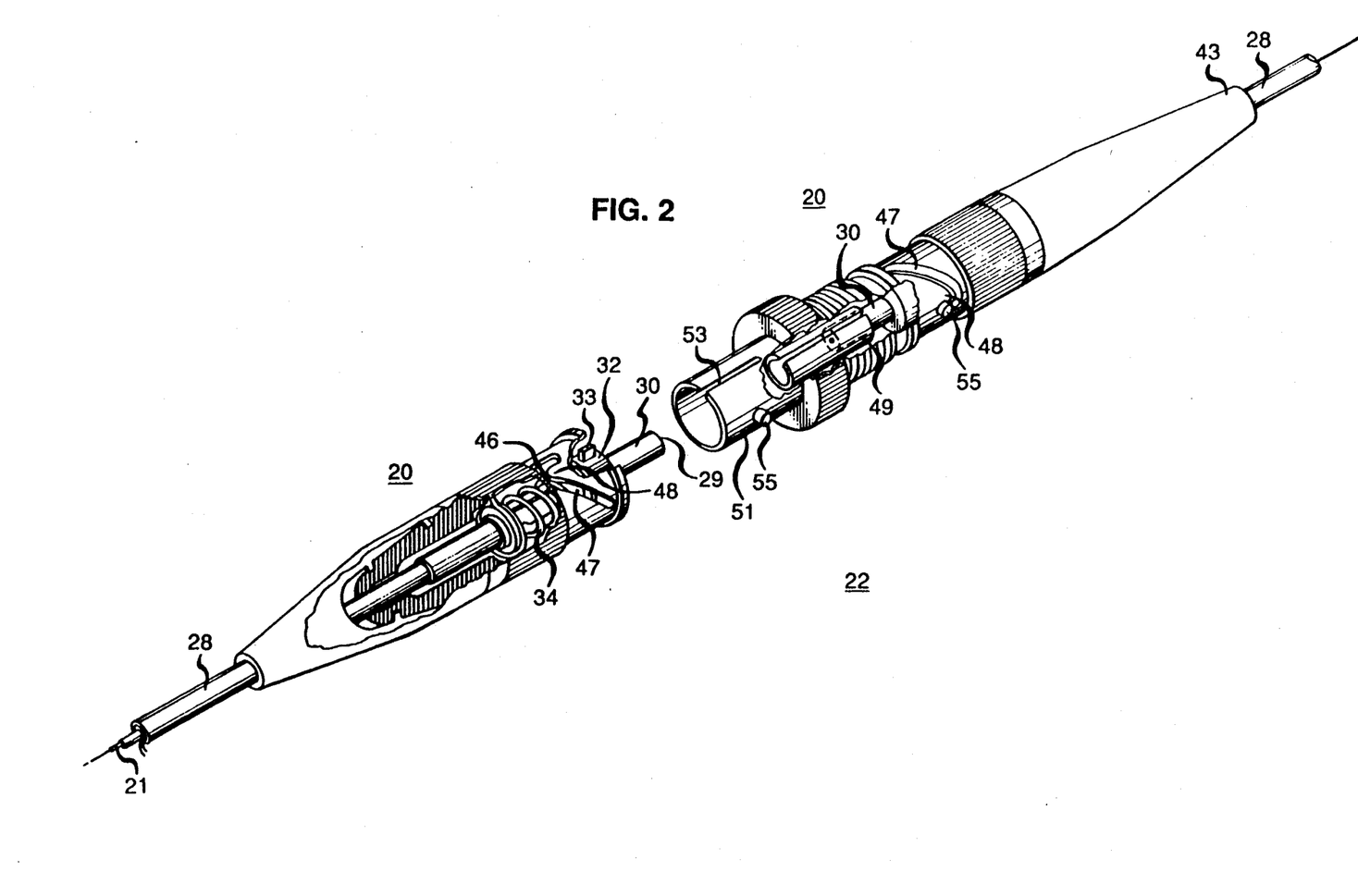
FIG. 2 is a perspective view of a ferrule type connector arrangement which includes two plug assemblies including two plugs each of which terminates an optical fiber an end portion of which is to be polished by the methods and apparatus of this invention.
Figure 3:
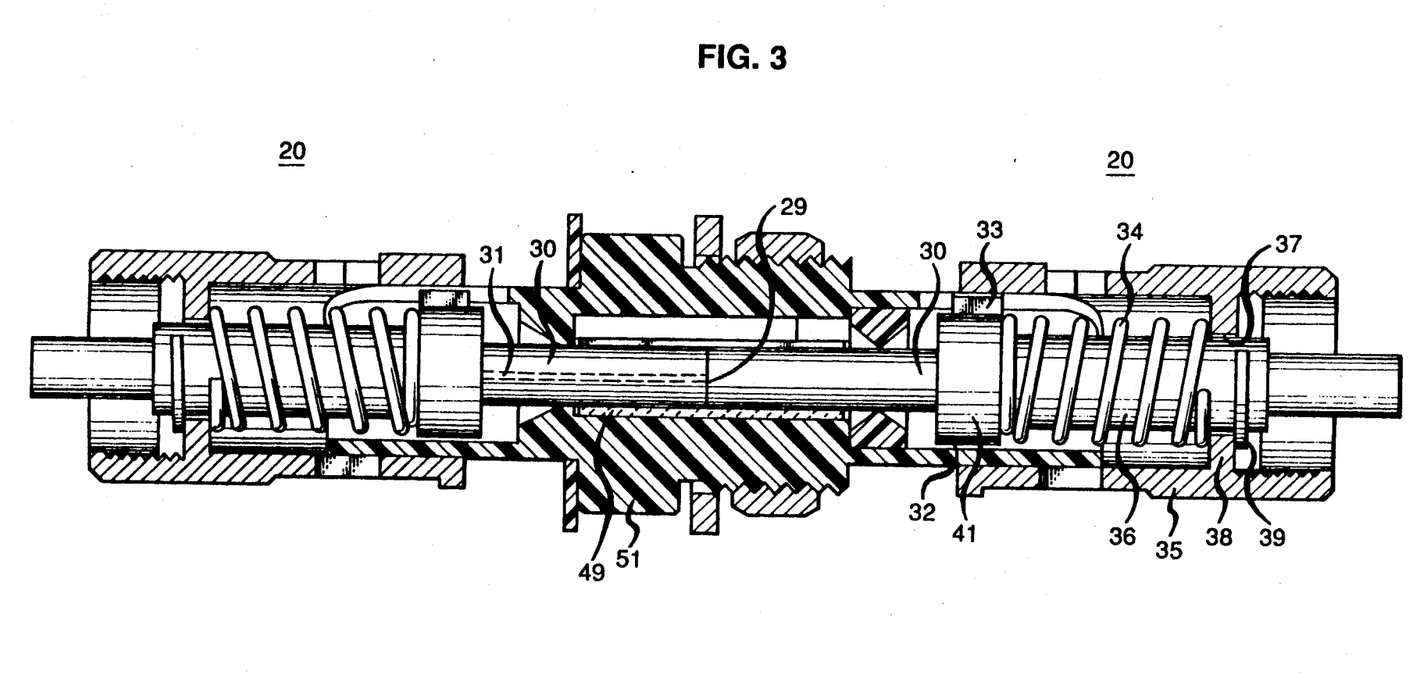
FIG. 3 is a front elevational partially sectional view of the arrangement of FIG. 2.

In terminating a cable 28, an uncoated end portion of the optical fiber 21 is inserted into the passageway 31 of each plug 30. The end portion of the optical fiber is secured within the passageway 31 of the plug 30 with an end portion of the optical fiber protruding from the end face of the plug. Then the end face of the optical fiber is cleaved which results in a portion of the end portion of the optical fiber remaining protruded from the plug end face.

Each termination also includes a connector body 32 (see FIGS. 2 and 3) made of a plastic or metallic material, a compression spring 34 and a tubular cap 35 made of a plastic or a metallic material. It should be observed that the plug 30, the connector body 32 and the cap 35 each has a cylindrical cross-section. The connector body 32 includes a separate orienting or alignment key 33 which projects radially from the longitudinal axis and which can be attached to the connector body at any of a plurality of positions.

The connector body 32 includes a small diameter portion 36 (see FIG. 3) which extends through an opening 37 in an internally disposed collar 38 in the cap 35. A retaining washer 39 circumscribes the small diameter portion on the outer side of the collar. The spring 34 is disposed about the smaller diameter portion 36 of the connector body 32 between the collar and a large diameter portion 41. As a result of this arrangement, the spring 34 biases the connector body 32 outwardly from the cable to hold the connector body within the cap 35. A tapered cable strain relief portion 43 (see FIG. 2) may be secured threadably to the cap 35.

Viewing again FIG. 2, it can be seen that each cap 35 includes a longitudinally extending slot 46 which at one end communicates with a circumferentially extending slot 47. The slot 47 is formed so that the tubular wall of the housing which defines it includes a latching projection 48. These slots 46 and 47 are used for securing a termination to another portion of a connection system.

For connection of two connectors 20—20, each plug 30 thereof is inserted into an end of a split sleeve 49 disposed in a housing 51. Each end of the housing 51 includes an slot 53 and two diametrically opposed pins 55—55. As each plug is inserted into the sleeve, the key 33 of the plug is moved into a slot 53 and each pin 55 is moved into a slot 47 and eventually into a latching slot 46.

Referring again to FIG. 1, it is seen that the apparatus 19 includes a platform or support plate 50 which is stationary. In order to support a plurality of the connector plugs 30—30, the platform 50 is adapted to support a plurality of connector plugs 30—30 so that their free end faces may be polished. In order to support a plurality of the connector plugs, the platform 50 has mounted thereon a plurality of connector nests 52—52 (see FIG. 4). Each nest 52 is adapted to receive a plug 30 of a connector.

Figure 4:
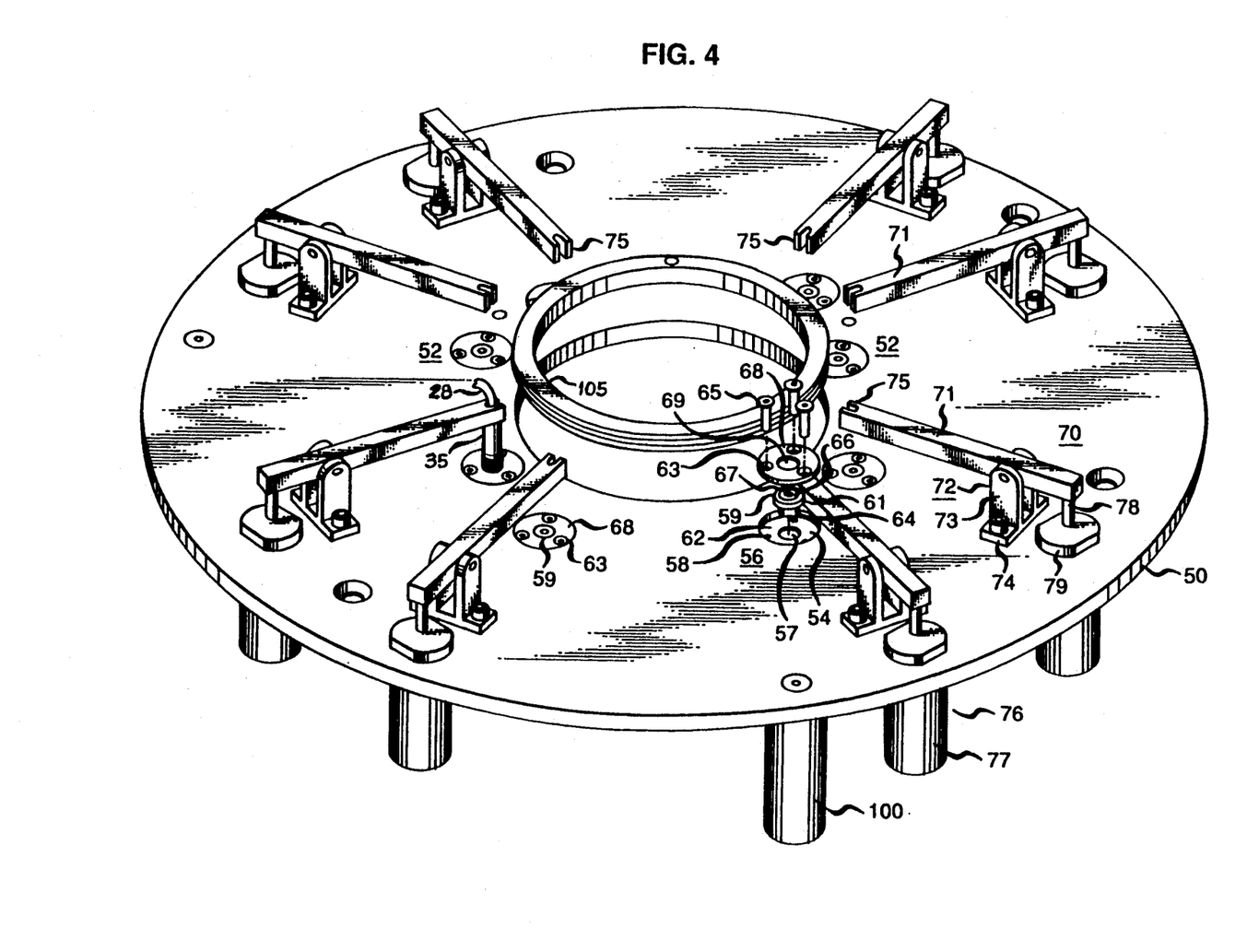
FIG. 4 is a perspective view of a portion of the apparatus of FIG. 1 for polishing an end face of each of a plurality of connector plugs of FIG. 2.

Each nest 52 comprises a disc-shaped recess 54 which is formed in the platform 50 and which opens to a top surface 56 thereof. Opening into the recess 54 is a center hole 57 and three smaller openings 58—58. Adapted to be received in each recess is an insert 59 having a stepped cylindrical configuration. The insert includes a center portion 61 adapted to be supported by a surface 62 which defines the recess and a lower portion 64 which is adapted to extend into the center hole 57. Extending upwardly from the center portion 61 is a disc-shaped portion 66. A passageway 67 extends through the disc-shaped portion 66, the center portion 61 and the lower portion 64. The passageway 67 is adapted to receive a plug 30 the end face of which is to be polished. The insert 59 which preferably is made of a wear-resistant material is held within the recess 54 by a cover plate 68.

In order to secure the cover plate 68, the cover plate includes three openings 63—63 which are aligned with the openings 58—58 in the platform 50. Also, the cover plate 68 includes a central opening 69 for receiving the disc-shaped portion 66 when the cover plate is secured to the insert 59 by fasteners 65—65.

As can be seen in FIG. 4, the platform 50 includes eight nests 52—52. The number of nests which are included is not important but it is important to understand that the apparatus 19 includes facilities for holding a plurality of connector plug assemblies 20—20 which are to be polished simultaneously.

Associated with each of the nests 52—52 is a force-applying device which is designated generally by the numeral 70 which is shown generally in FIG. 4. Each force-applying device 70 includes an arm 71 which is mounted pivotally in a bearing 72. Each bearing 72 includes spaced side arms 73—73 upstanding from a base 74 which is attached to the platform 50.

Aligned with an outer end of each arm 71 is an actuating device 76. The actuating device 76 includes a pneumatically controlled cylinder (not shown) being disposed in a holder 77 and having a plunger 78 adapted to extend therefrom and through a hole in the platform 50 and an aligned hole in a guide pad 79. In operation, actuation of the cylinder causes an upper end portion of the plunger 78 to engage an underside surface of an outer end portion of the associated arm 71.

Going now to an inner end portion of each arm of the embodiment shown in FIG. 4, it can be seen that the inner end portion is notched to provide bifurcated end portions 75—75. When a connector assembly is mounted in a nest 52 with the plug 30 thereof extending into the insert 59, the arm is controlled to cause the bifurcated portions 75—75 which define the notched end portion of the arm 71 to engage an outer surface of the cap 35 of the connector assembly (see FIG. 4).

It should be noted that other force-applying arrangements may be used to accommodate different kinds of ferrule connectors or to apply forces to connectors 20—20 which already have strain relief portions 43—43 assembled thereto. Such devices are easily exchanged with those depicted in FIG. 4 by removing and then reinserting threaded fasteners which hold the force-applying device to the platform 50.

Figure 5:
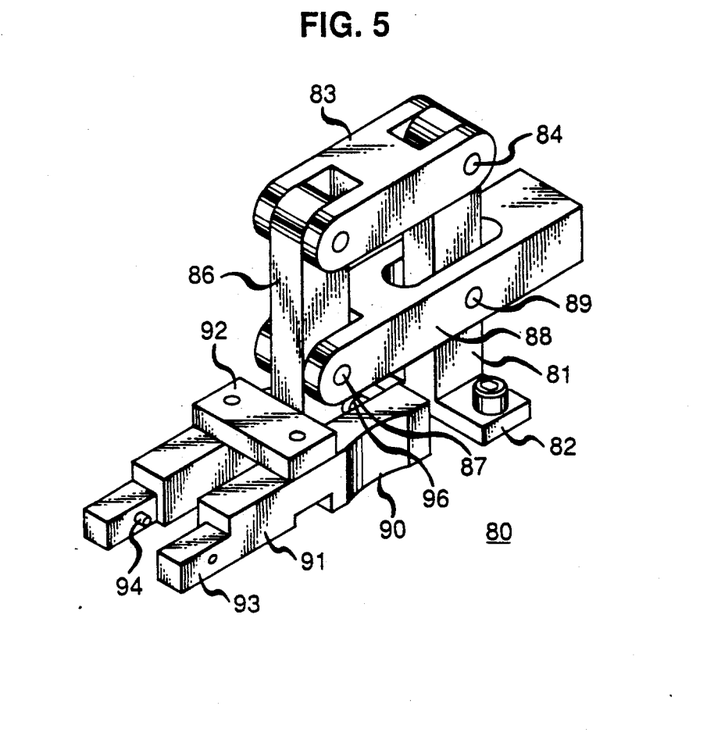
FIG. 5 is a perspective view of a preferred embodiment of a device for applying forces to a connector plug.

Referring now to FIG. 5, there is shown another force-applying device which is designated generally by the numeral 80. The force-applying device 80 includes a column 81 supported from a base 82 which is adapted to be attached to the platform 50. A link 83 is connected pivotally to the column 81 by a pin 84 and at an opposite end to a hanger 86. Connected pivotally to the hanger 86 through a pin 87 is a lever 88 which is mounted pivotally through a pin 89 to the column 81. The force-applying device 80 is attached to the platform 50 so that a plunger 78 is aligned with an end portion of the lever 88. Attached to a lower end of the hanger 86 is a force applying member 90 which includes two arms 91—91 held apart by a spacer bar 92. Inwardly extending from an end portion 93 of each arm 91 is a pin 94. The pins 94—94 are aligned along their axes. Opposite ends of the arms 91—91 have a compression spring 96 therebetween.

The force-applying device 80 is the preferred embodiment for applying forces to the plug assembly. An operator causes the end portions 93—93 of the arms 91—91 to be moved apart, overcoming the bias of the spring 96. Then the operator positions a plug assembly in the nest associated with the force applying device between the end portions of the arms 91—91 and releases the arms after causing the pins 94—94 to be aligned with the latching slots 46—46 of the plug assemblies. This causes each pin 94 to be received in a latching slot 46.

Further, as can be seen in FIG. 1, the apparatus includes a plurality of posts 100—100 spaced about the periphery of the platform 50. The posts 100—100 are adapted to support the platform 50. Viewing FIG. 1, it can be seen that the posts 100—100 are supported by a base 102. When the platform 50 is mounted on the posts 100—100, the platform is spaced slightly above a polishing turntable 106. Further, when the platform 50 is supported on the posts 100—100 and plugs 30—30 inserted into the inserts 59—59, end faces of fibers terminated by the plugs engage a polishing surface 107 which is faced with a polishing material of a predetermined grit size. Varying polishing materials may be used depending on the desired finish and on the product involved. Interposed between the polishing material and the turntable 106 is a backing material (not shown) which has a predetermined compliancy.

The platform 50 may be provided with an annular member 105 (see FIG. 4) which is pressed into a center opening of the platform. The annular member may be used to provie a polishing lubricant to the polishing surface 107 below through top and bottom openings and grooves in an outer circumferential surface thereof.

The apparatus 19 includes provisions for causing relative motion to occur between the platform 50, and hence the plugs held therein, and the polishing surface. The motion is accomplished in such a way as to cause each fiber and associated plug end face to trace out a predetermined path on the polishing surface.

The relative motion in the preferred embodiment is caused to occur by an arrangement designated generally by the numeral 110 (see FIGS. 1 and 6) which is adapted to move the turntable 106. The arrangement 110 includes a cylindrical housing 112 which is adapted to be turned by a belt 113 wrapped about a drive pulley 114 of a motor 108 supported in the base 102. A centrally disposed shaft 116 is fixedly supported in a plate 115 and has a gear 125 attached to the shaft between the housing 112 and the plate. The gear 125 is stationary.

Figure 6:
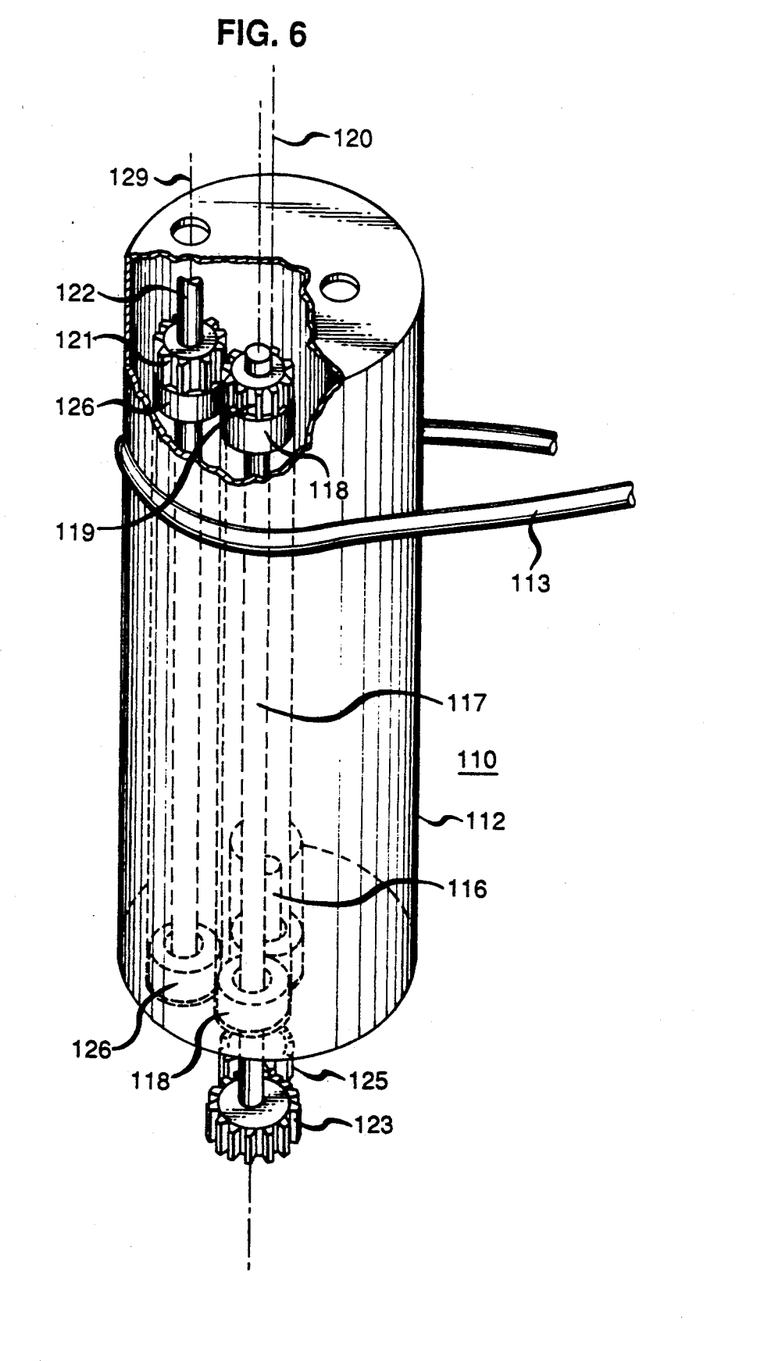
FIG. 6 is a perspective view of an arrangement for causing motion of the polishing surface.

The arrangement 110 is such that when the belt turns the cylinder, the cylinder causes a vertical shaft 117 supported in bearings 118—118 mounted adjacent to the periphery of the housing 112 to revolve about a vertical centerline axis 120 of the housing. The shaft 117 has attached thereto a gear 123 which meshes with the gear 125 so that as the housing is rotated about its centerline axis, the gear 123 is caused to revolve about the gear 125, thus causing the shaft 117 to turn rotatably. The shaft 117 also has attached thereto adjacent to a top of the housing a gear 119 which is intermeshed with a gear 121 attached to a shaft 122. When the shaft 117 is turned by the motion of the cylinder housing 112, the gear 119 turns the gear 121 and hence the shaft 122 which also is mounted in bearings 126—126 supported in the housing. The shaft 122 is attached to a bushing 130 which supports the turntable 106. As a result, rotation of the shaft 122 causes the turntable to turn about its vertical centerline axis 129.

Figure 7:
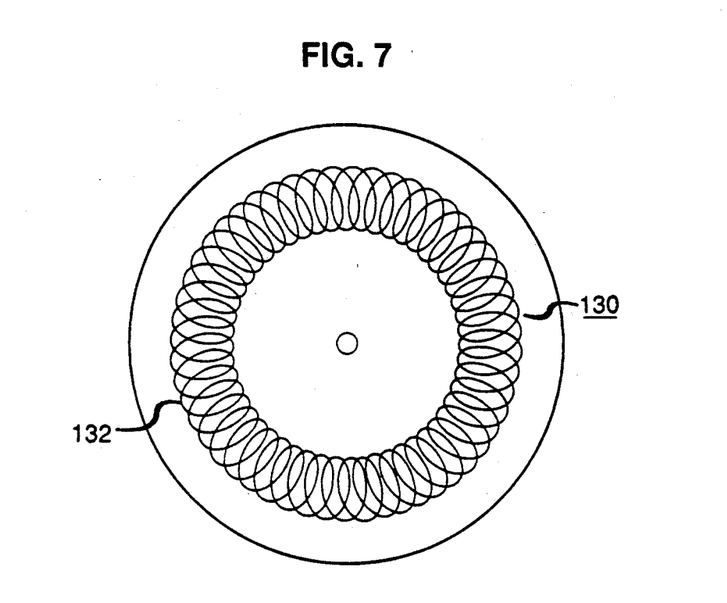
FIG. 7 is a plan view of an annular pattern which is traced out by a fiber end face on the polishing surface of the apparatus of FIG. 1.

As a result of the above described planetary gear arrangement, the polishing surface is caused to be turned rotatably about the centerline axis 129 of the polishing surface. The centerline axis 129 is oriented vertically. At the same time, the polishing surface is caused to be revolved about the centerline axis 120 of the housing which is parallel to the centerline axis 129. As a result, an end face of each fiber and of each plug is caused to trace out a pattern 130 such as is shown in FIG. 7. Further as a result, contact of each end face with the polishing surface is distributed uniformly over a relatively large annular area 132 thereof instead of being confined to a smaller one. This lengthens the wear of the polishing medium and ensures more uniformly polished end faces.

As a result of the individual nests and the individual force-applying devices associated with each plug, forces which are applied to each plug can be varied to control the pressure between the fiber and or plug end face and the polishing surface. Initially, when a portion of fiber extends beyond the plug end face as a result of a cleaving operation, the pressure between the fiber end and the polishing surface should be relatively low to avoid cracking the fiber. Then as the fiber is polished and its end becomes substantially coplanar with the end face of its associated plug, the pressure is ramped up to cause both the fiber end and, in desired instances, the end face of the plug to be polished.

Although substantially equal forces are applied by each force-applying device to a plug, the pressure between the fiber end face and the polishing surface is controlled because that force is applied to a single plug and not to a device which distributes the forces to each of a plurality of plugs.

in a preferred embodiment, the apparatus 19 is adapted to discontinue rotation of the polishing surface after a predetermined cycle time which generally corresponds to just after the time required to polish the end portion of each fiber to be coplanar with an end face of the plug in which the fiber is terminated. As a result, the end face of the plug in which the fiber is terminated may experience some contact by the polishing surface. This may not result in any polishing of the end face of the plug because of the hardness of the material of which it is made relative to that of the grit of the polishing surface. In effect, the end faces of the plugs function to discontinue the polishing operation and set the extent of polishing for each fiber. Should it be desired to polish the end faces of the plugs, then a suitable grit of greater hardness may be used and the cycle time changed.

Although the preferred embodiment has been described for the polishing of fiber end faces and then, if required, of end faces of plugs which terminate the fibers, the invention is not so limited. The methods and apparatus of this invention may be used to polish surfaces of an article such as end faces, for example, of plugs which do not yet terminate optical fibers. Although breakage of such plugs caused by excessive pressures on the longer ones of the plugs is not very likely, the methods and apparatus of this invention provide for gang-polishing of a plurality of plugs with consistent radii of curvature of the end portions and result in wear life of the polishing surface which is extended over prior that of art polishing apparatus.

It is to be understood that the above-described arrangements are simply illustrative of the invention. Other arrangements may be devised by those skilled in the art which will embody the principles of the invention and fall within the spirit and scope thereof.

We claim:

1. An apparatus for polishing simultaneously an end face of each of a plurality of optical fiber end faces terminated by connector plugs, said apparatus comprising:
    platform means, including a plurality of nests, for holding a free end portion of each of a plurality of plugs, each of which terminates an optical fiber such that each plug has a degree of freedom relative to each plug's corresponding nest;
    a polishing surface;
    means for causing an end face of each fiber which extends beyond a free end face of a plug in which it is terminated to engage the polishing surface;
    force-applying means associated with each nest for causing separate and variable forces to be applied in a controlled manner individually to each of the plugs to control the pressure between each fiber end face and the polishing surface, wherein said force-applying means includes a pivotally mounted arm having one end in engagement with a connector plug assembly which includes a plug and an opposite end, the position of which is controlled by an air cylinder; and
    drive means for causing the polishing surface to rotate about its centerline axis and simultaneously for causing the polishing surface to revolve about a second axis parallel to the centerline axis such that each fiber end face is polished by an annular portion of the polishing surface.

2. The apparatus of claim 1, wherein said air cylinder is substantially frictionless.

3. The apparatus of claim 1, wherein said one end of said arm is provided with pins adapted to engage openings within a lateral surface of a cap of the plug assembly.

4. An apparatus for polishing simultaneously an end face of each of a plurality of optical fiber end faces terminated by connector plugs, said apparatus comprising:
    platform means, including a plurality of nests, for holding a free end portion of each of a plurality of plugs, each of which terminates an optical fiber such that each plug has a degree of freedom relative to each plug's corresponding nest;
    a polishing surface;

means for causing an end face of each fiber which extends beyond a free end face of a plug in which it is terminated to engage the polishing surface;

force applying means associated with each nest for causing separate and variable forces to be applied in a controlled manner individually to each of the plugs to control the pressure between each fiber end face and the polishing surface; and drive means for causing the polishing surface to rotate about its centerline axis and simultaneously for causing the polishing surface to revolve about a second axis parallel to the centerline axis such that each fiber end face is polished by an annular portion of the polishing surface wherein said drive means for causing the polishing surface to rotate about a centerline axis includes a cylindrical housing having a first shaft extending outwardly therefrom through a bearing along a centerline axis, said first shaft having a gear mounted thereon, said first shaft and gear attached thereto being stationary, said drive means also including a second shaft which is parallel to said first shaft and mounted in bearings adjacent to the periphery of said housing, said second shaft having one gear which intermeshes with said gear of said first shaft adjacent to a lower end of said housing and another gear adjacent to an opposite end of said housing and intermeshing with a gear which is attached to a third shaft which is mounted in bearings disposed adjacent to the periphery of said housing, said third shaft being connected to said polishing surface, said drive means further including means for causing said housing to be turned rotatably about its centerline axis to cause said gear at said one end of said second shaft to turn said gear at said other end to turn said gear on said third shaft to turn said polishing surface rotatably about its centerline axis while said polishing surface is being revolved about said centerline axis of said housing.

* * * * *